United States Patent
Bostick et al.

(10) Patent No.: US 10,348,964 B2
(45) Date of Patent: Jul. 9, 2019

(54) METHOD AND SYSTEM FOR 360 DEGREE VIDEO COVERAGE VISUALIZATION

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 15/602,440

(22) Filed: May 23, 2017

(65) Prior Publication Data

US 2018/0343387 A1 Nov. 29, 2018

(51) Int. Cl.
*H04N 5/232* (2006.01)
*G06K 9/00* (2006.01)

(52) U.S. Cl.
CPC ..... *H04N 5/23238* (2013.01); *G06K 9/00671* (2013.01)

(58) Field of Classification Search
None
See application file for complete search history.

(56) References Cited

U.S. PATENT DOCUMENTS

| | | | |
|---|---|---|---|
| 9,163,944 B2 | 10/2015 | Satti | |
| 9,471,837 B2 | 10/2016 | Anderson et al. | |
| 2005/0149514 A1* | 7/2005 | Tsuzuki | G06F 17/30017 |
| 2015/0063553 A1* | 3/2015 | Gleim | H04M 3/568 |
| | | | 379/202.01 |
| 2016/0005435 A1* | 1/2016 | Campbell | H04N 9/806 |
| | | | 386/240 |
| 2017/0006275 A1 | 1/2017 | Gerard et al. | |
| 2017/0026577 A1 | 1/2017 | You et al. | |
| 2018/0160194 A1* | 6/2018 | Bayliss | H04N 21/47217 |
| 2018/0276891 A1* | 9/2018 | Craner | G06T 19/003 |

OTHER PUBLICATIONS

Ashcroft, Sam, "Interaction is key to a decent real world VR experience", www.wareable.com, Aug. 11, 2015, 3 pgs.

(Continued)

*Primary Examiner* — Eileen M Adams
(74) *Attorney, Agent, or Firm* — James R. Nock; Maxine L. Barasch; Keohane & D'Alessandro PLLC (57) ABSTRACT

Disclosed embodiments provide techniques for 360 degree video visualization. Various criteria such as user preferences, and/or crowdsourced information are used as triggers to signal a user device with indications for a direction of view recommendation. The direction of view recommendation instructs or suggests to the user to perform an action to change the viewpoint so that they can observe an object that they may otherwise miss. Additionally, a pre-navigated video may be created for the user. The pre-navigated video includes a sequence of viewing directions and point-of-view changes to include viewing of objects that are deemed to be of potential interest to the user. In this way, a user can have an improved 360 degree video experience which includes customized and/or crowdsourced recommendations.

17 Claims, 9 Drawing Sheets

(56) References Cited

OTHER PUBLICATIONS

Melcher, Paul, "The Next Big Thing: Interactive VR", http://kaptur.co/the-next-big-thing-interactive-vr/, Jan. 6, 2016, 6 pgs.
Keating, Lauren, "Facebook Users Can Now Use Reactions in Virtual Reality for 360-Degree Videos", Jun. 23, 2016, 3 pgs.
Resnick, Brian, "Watch: this 360-degree video of a tornado will make you fear the power of almighty nature", http://www.vox.com/2016/5/9/11643534/360-degree-video-tornado, May 9, 2016, 3 pgs.
Unknown, "Facebook 360", https://www.facebook.com/Facebook360/, Sep. 2015, 4 pgs.
Unknown, "360 Videos", www.360-degree-video.com, Aug. 2013, 8 pgs.

* cited by examiner

METHOD AND SYSTEM FOR 360 DEGREE VIDEO COVERAGE VISUALIZATION

FIELD OF THE INVENTION

Embodiments of the invention relate to methods and systems for 360 degree video coverage visualization.

BACKGROUND

Today, use of 360 degree video is becoming common with improvements in photography, as well as virtual reality and augmented reality systems. This type of video allows a user to view the virtual environment from any direction in the 360 degree circle around him/her. There can be various points of interest (POIs) in different portions of 360 degree videos. The videos can include various objects, events, avatars, advertisements, etc. that may be of interest to them. Accordingly, there exists a need for improvements in 360 degree video coverage visualization.

SUMMARY

Disclosed embodiments provide techniques for 360 degree video visualization. Various criteria such as user preferences, and/or crowdsourced information are used as triggers to signal a user device with indications for a direction of view recommendation. The direction of view recommendation instructs or suggests to the user to perform an action to change the viewpoint so that they can observe an object that they may otherwise miss. Additionally, a pre-navigated video may be created for the user. The pre-navigated video includes a sequence of viewing directions and point-of-view changes to include viewing of objects that are deemed to be of potential interest to the user. In this way, a user can have an improved 360 degree video experience which includes customized and/or crowdsourced recommendations.

In one aspect, there is provided a computer-implemented method for creating a recommendation of direction of view for a 360 degree video, comprising: obtaining preference data for a user; analyzing the preference data to derive one or more keywords; identifying at least one object in the 360 degree video that corresponds to the one or more keywords; evaluating a proximity of the at least one identified object from a field of view of the user on the user device; determining, based on the evaluation, that the identified at least one object is in a potential field of view; and providing a direction of view recommendation to a user device in response to the determining.

In another aspect, there is provided an electronic device for creating a recommendation of direction of view for a 360 degree video, comprising: obtaining preference data for a user; analyzing the preference data to derive one or more keywords; identifying at least one object in the 360 degree video that corresponds to the one or more keywords; evaluating a proximity of the at least one identified object from a field of view of the user on the user device; determining, based on the evaluation, that the identified at least one object is in a potential field of view; and providing a direction of view recommendation to a user device in response to the determining.

In yet another aspect, there is provided a computer program product for creating a recommendation of direction of view for a 360 degree video on an electronic computing device, the electronic computing device comprising a computer readable storage medium having program instructions embodied therewith, the program instructions executable by a processor to cause the electronic computing device to: obtain preference data for a user; analyze the preference data to derive one or more keywords; identifying at least one object in the 360 degree video that corresponds to the one or more keywords; evaluate a proximity of the at least one identified object from a field of view of the user on the user device; determine, based on the evaluation, that the identified at least one object is in a potential field of view; and provide a direction of view recommendation to a user device in response to the determining.

BRIEF DESCRIPTION OF THE DRAWINGS

Features of the disclosed embodiments will be more readily understood from the following detailed description of the various aspects of the invention taken in conjunction with the accompanying drawings.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for 360 degree video visualization. Various criteria such as user preferences and/or crowdsourced information are used as triggers to signal a user device with indications for a direction of view recommendation. The direction of view recommendation instructs or suggests to the user to perform an action to change the viewpoint so that they can observe an object that they may otherwise miss. Additionally, a pre-navigated video may be created for the user. The pre-navigated video includes a sequence of viewing directions and point-of-view changes to include viewing of objects that are deemed to be of potential interest to the user. In this way, a user can have an improved 360 degree video experience which includes customized and/or crowdsourced recommendations.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions.

Figure 1:
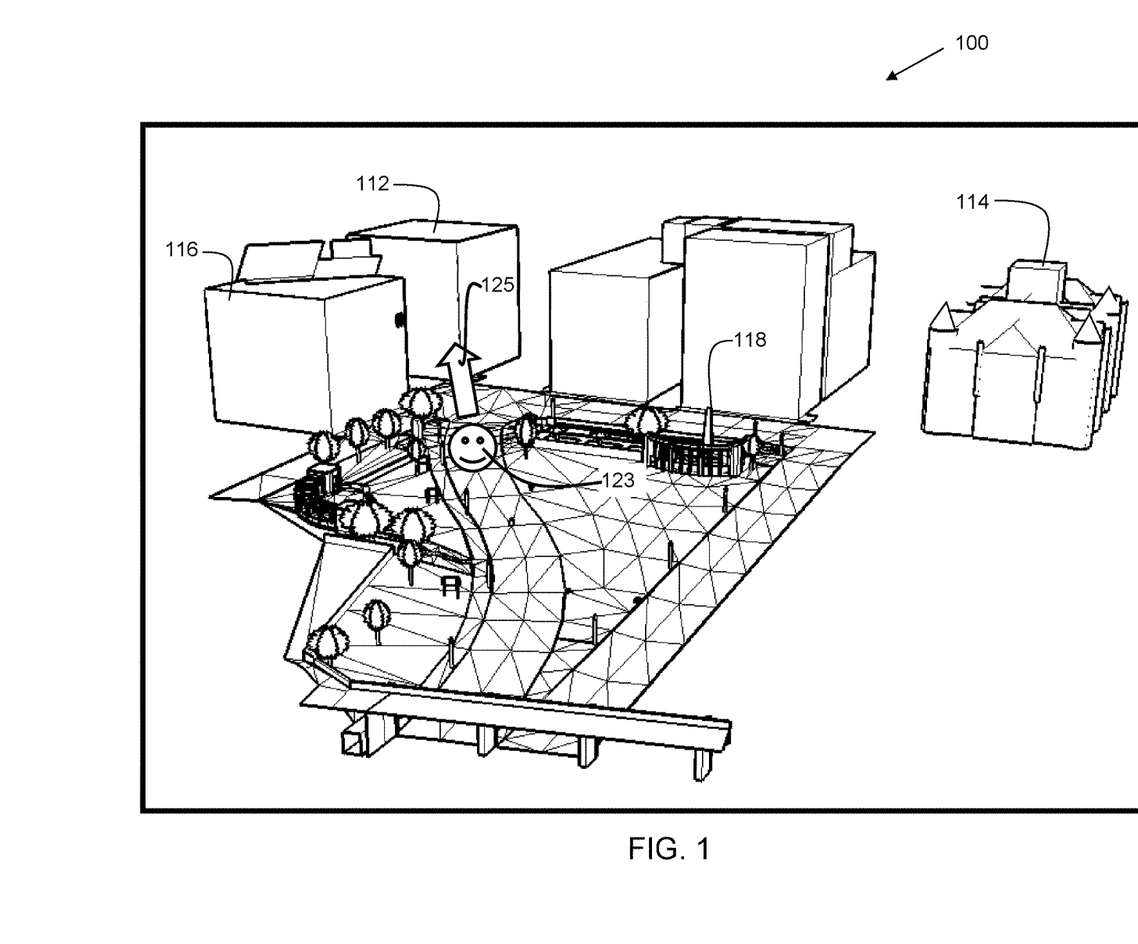
FIG. 1 illustrates a perspective view of a scene indicating a user viewpoint.

FIG. 1 illustrates a perspective view of a scene indicating a user viewpoint. Multiple points of interest are included in the scene, for example, buildings 112, 114 (castle), and 116, monument 118, and other unlabeled objects. User 123 is facing in direction of arrow 125. Buildings 112 and 116 are within the user's current field of view. Building 114 and monument 118 are outside of the user's current field of view. In the example, the user is wearing a virtual reality goggle headset that allows a user to view a scene from a vantage point anywhere in a 360 degree line of sight. The headset includes sensors therein or in communication that sense directionality and movement of the user's head and/or body, and an internal computer that changes the viewpoint on one or more screens to show images of 360 degree video accordingly.

Figure 2:
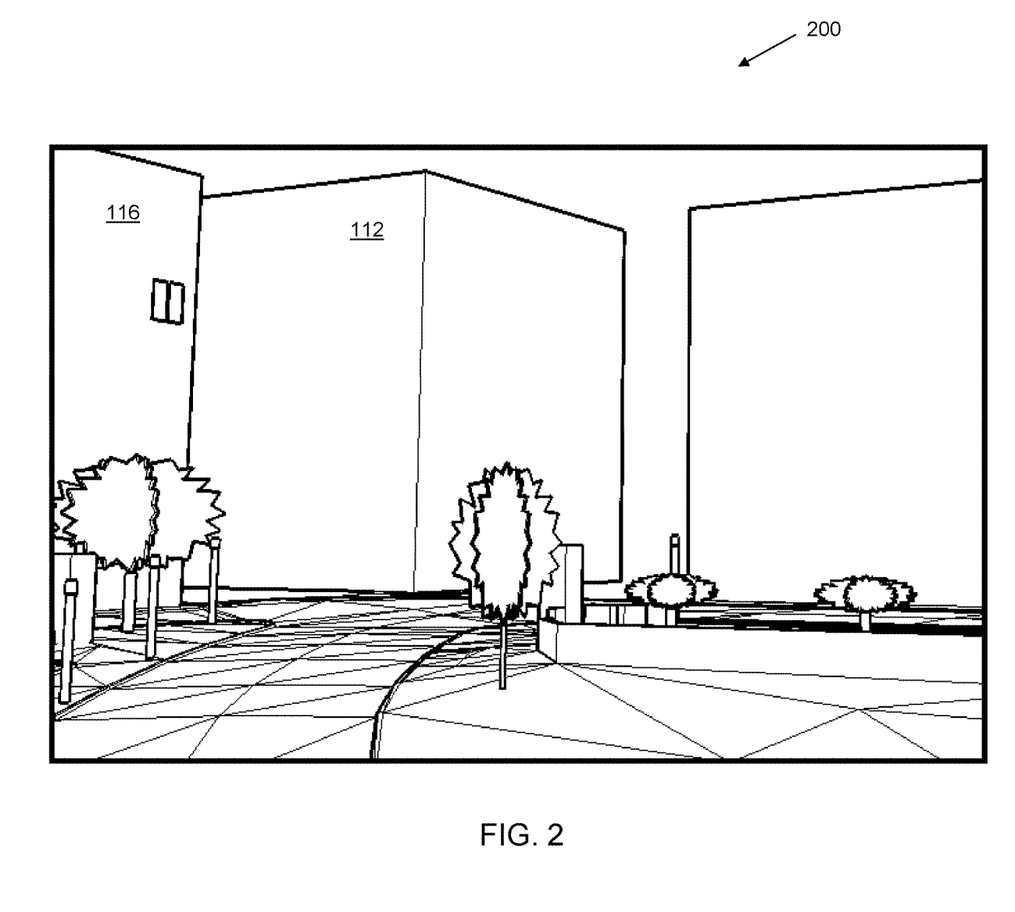
FIG. 2 illustrates a user viewpoint in a first direction.

FIG. 2 illustrates a user viewpoint 200 in a first direction. This shows the scene of FIG. 1 from the user's perspective, facing in the direction of arrow 125 (FIG. 1). As shown, building 112 is substantially straight ahead and building 116 is slightly to the left. Various other objects are visible as well including the ground, trees, and a wall barrier.

Embodiments of the present invention create a direction of view (DOV) recommendation for a 360 degree video. Preference data for a user is obtained. The preference data for a user may be obtained from one or more social media profiles, natural language processing of e-mails, texts, social media posts, and/or other electronic communication. The natural language processing can include disambiguation, entity detection, sentiment analysis, emoticon analysis, and/or other suitable techniques.

The user preference data is analyzed to derive one or more keywords. Objects are identified in the 360 degree video that correspond to the one or more keywords. It is determined that the identified objects are in a potential field of view on the user device. A direction of view and/or direction of travel recommendation is generated, and provided to a user device in response to the determination.

A "potential field of view" is an area close enough in proximity to a user (the user's field of view) that the user could reasonably look to or travel to see such field of view imminently or without unreasonable delay. This may depend on factors such as distance, directionality, and whether any barriers are in the way. For example, if an object is 150 feet from the user's current field of view without an intervening barrier, the object may be determined within the potential field of view of the user at that current time. If there is a set of large trees blocking the object, then the object may not be within the potential view of view. If the object is 5 miles away, the distance may be determined to be above a reasonable preset threshold.

Figure 3:
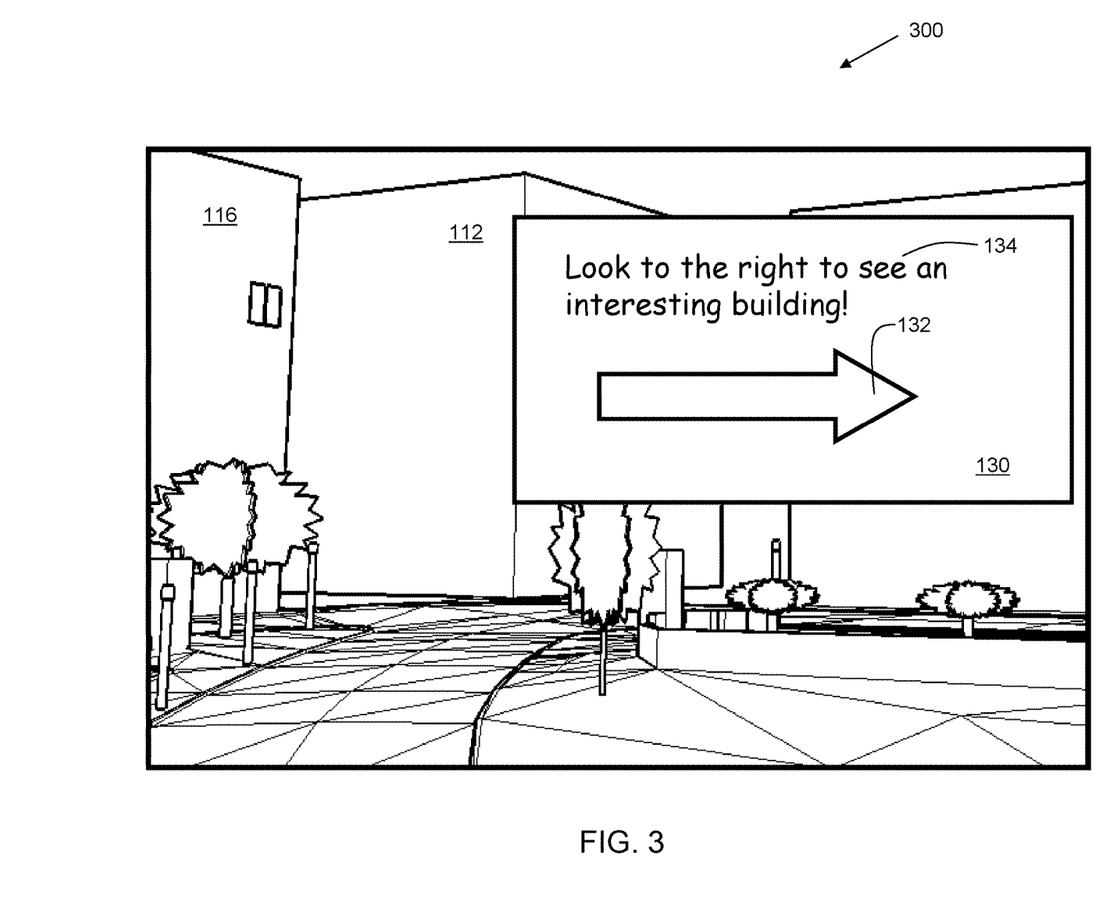
FIG. 3 illustrates a visual cue provided to a user device in accordance with embodiments of the present invention.

FIG. 3 illustrates a user viewpoint 300 including an example of a message 130 provided to a user device in accordance with embodiments of the present invention. The user is facing in the direction of arrow 125 in scene 100 (FIG. 1). Buildings 112 and 116 are in view as described with regard to FIG. 2. Based on an analysis of previously-obtained user preference data, one or more keywords are derived. Objects are identified in the 360 degree video that correspond to the one or more keywords. Examples of such keywords can include things such as "Mount Rushmore" and "Irish Castles" and may be found in metadata for the user. Accordingly, it is determined that monuments, statues, and castles are of interest to the user. Therefore, it is determined that the monument 118 and castle 114 in the potential field of view on the user device would be of interest to the user. A direction of view and/or direction of travel recommendation is generated, and provided to a user device in response to the determination.

In some embodiments, a direction of view recommendation is provided via a visual cue. In some embodiments, the visual cue may be, e.g., without limitation, an arrow. This type of recommendation suggests that the user "move" his/her head or orientation of view to a particular direction. In the example, message 130 is provided to the user, including a visual cue 132 indicating a suggested change to the direction the user is facing. In the example, a brief explanation 134 is included as well in the message, reciting: "Look to the right to see an interesting building!" Note that the explanation is optional and, in some embodiments, the cue is instead provided alone. Referring again to FIG. 1, in this example, the building of interest is building 114. Thus, the user 123 is currently viewing 360 degree video facing the direction indicated by arrow 125, and now is receiving a DOV recommendation to look to his/her right so that building 114 can be viewed.

In some embodiments, rather than a visual cue, the cue may instead be audio or tactile feedback. Accordingly, in some embodiments, the direction of view recommendation is provided via an audio cue. The cue may be recited via a speaker to the user. In some embodiments, the direction of view recommendation is provided via a tactile cue. The cue may be, for example, a vibration, pulsation, or other tactile indication. For example, if the user is wearing a virtual reality headset that attaches to each ear, a cue to turn to the right may be delivered by a vibration of the piece on the right ear. A cue to turn left may be delivered by a vibration of the piece on the left ear.

In some embodiments, an audio cue may be encoded into an object-oriented audio format. The audio cue may then be located in a specific sound plane relative to the location of the object. In this way, rather than simply being cued to look left or right, the user can be presented with an audio cue that seems to originate from the specific direction of the recommended object. For example, during a 360 degree video, an audio cue can include a phrase such as "Look over here!" where the phrase is encoded to seem as if it is originating from the direction coinciding with an object of interest (e.g. a monument). This can make for a more interactive 360 degree video experience.

Figure 4:
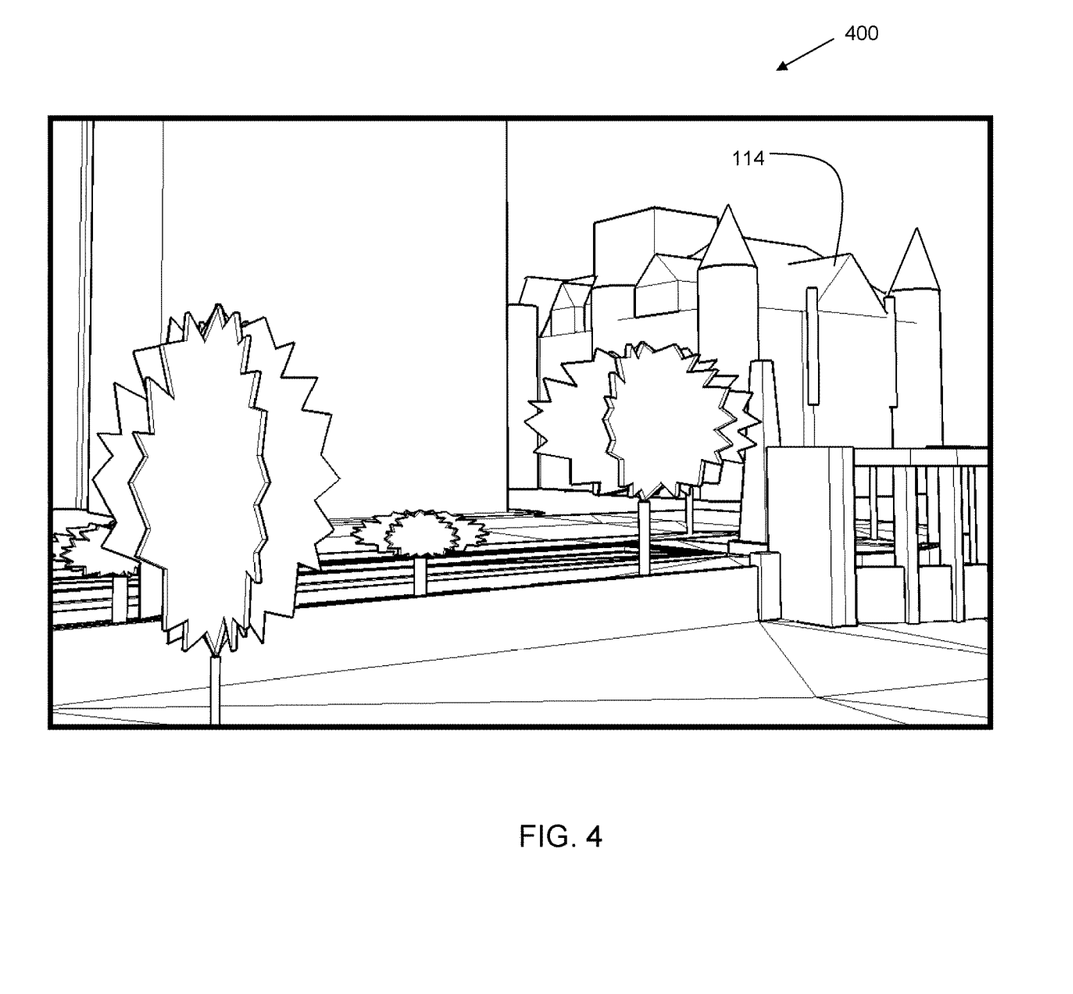
FIG. 4 illustrates a user viewpoint in a second direction.

FIG. 4 illustrates a user viewpoint 400 in a second direction. In this example, the user has turned her head to the right as compared to her orientation of view in FIG. 2 in scene 100. The recommended building 114 is now in the user's field of view, rather than buildings 112 and 116. Building 114 is something that the user may have otherwise missed had they not received a direction of view recommendation in accordance with embodiments of the present invention.

Figure 5:
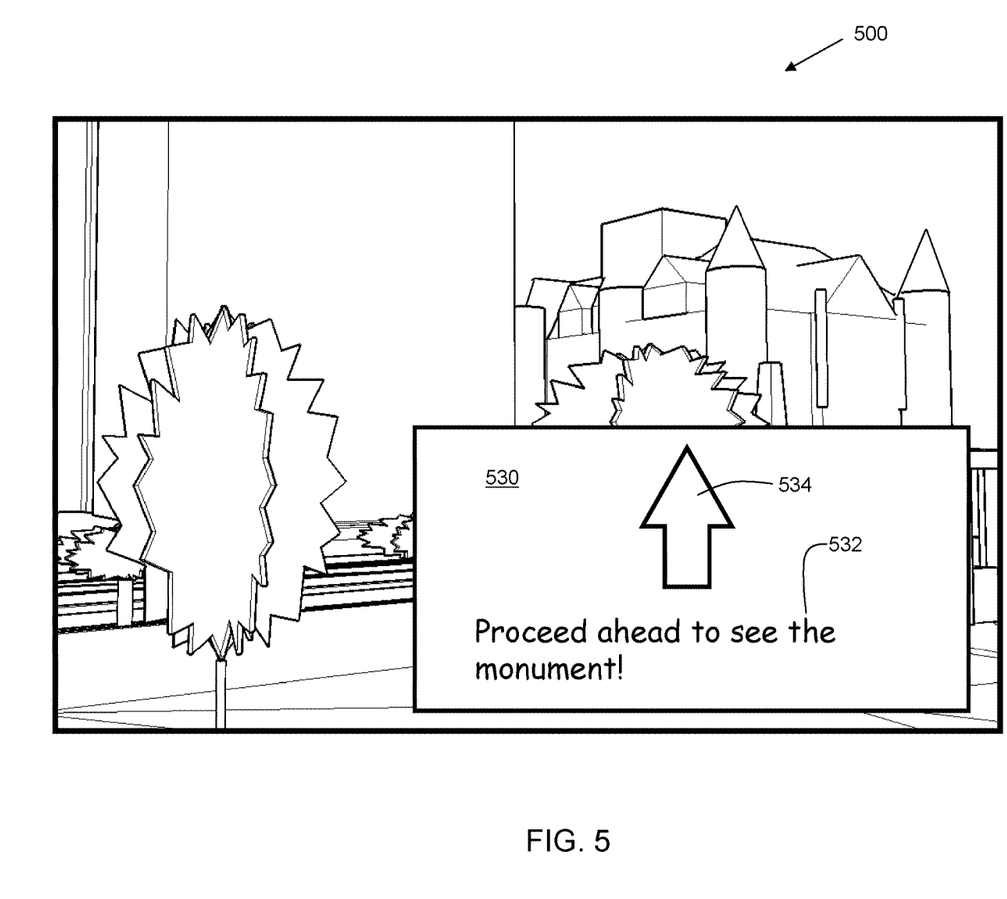
FIG. 5 illustrates another visual cue provided to a user device in accordance with embodiments of the present invention.

FIG. 5 illustrates another message 500 provided to a user device in accordance with embodiments of the present invention. In some embodiments, a direction of travel (DOT) recommendation is provided via a visual cue. In some embodiments, the visual cue may be, e.g., without limitation, an arrow. This type of recommendation suggests that the user "move" in a particular direction. In the example, a message 530 is provided to the user, including a visual cue 534 indicating a suggested direction of travel for the user. In the example, a brief explanation 532 is included as well in the message, reciting, "Proceed ahead to see the monument!" Note that the explanation is optional and, in some embodiments, instead the cue is provided alone.

In the example, the user followed the instruction of the first cue by turning her view to the right. Once there, the user was provided a second cue, instructing the user to proceed ahead. Thus, embodiments may include providing a plurality of direction of view recommendations. Additionally, embodiments may include providing a plurality of direction of travel recommendations. A direction of view (DOV) recommendation is equivalent to a recommendation for a user to turn to face a particular direction. A direction of travel (DOT) recommendation is equivalent to a recommendation for a user to move from a current location within a 360 degree video to a new location within a 360 degree video.

Figure 6:
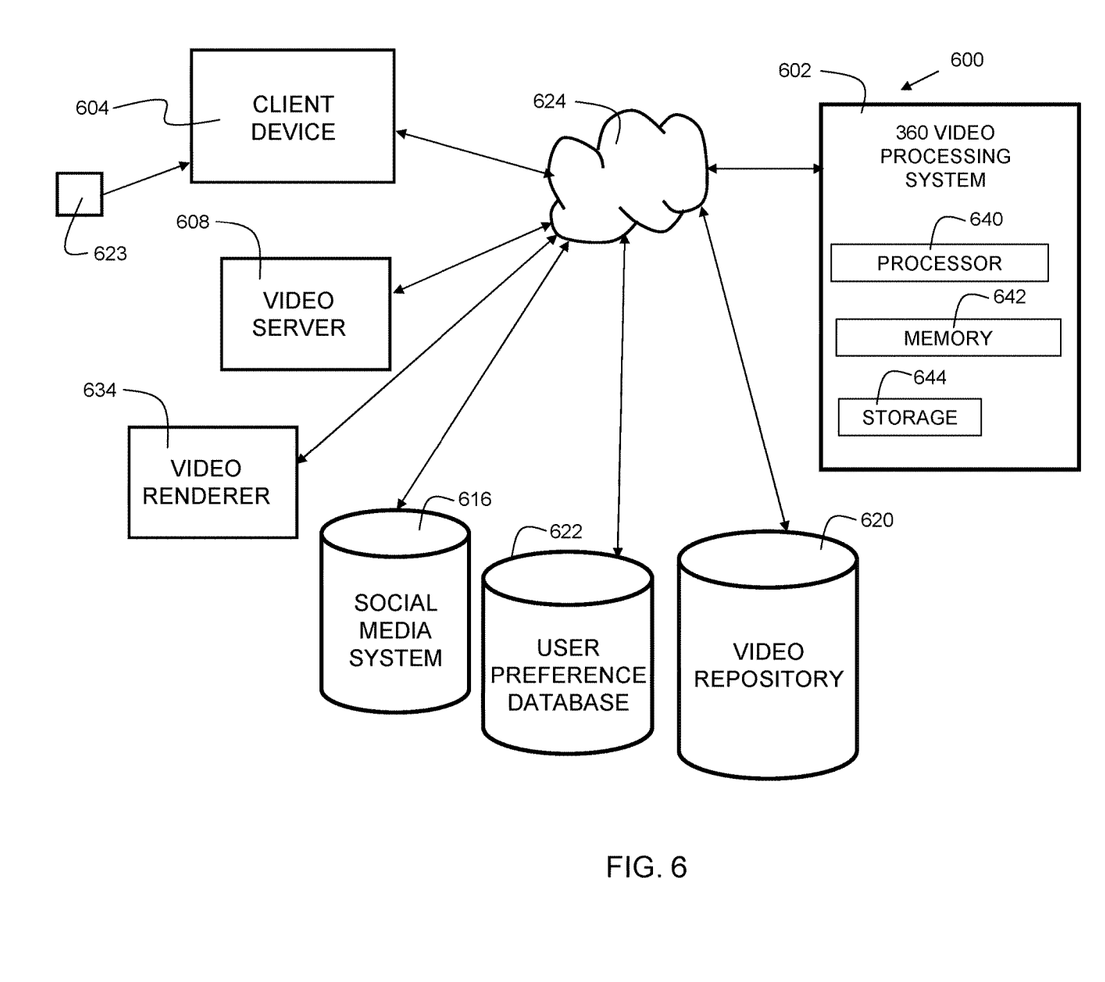
FIG. 6 illustrates an environment including embodiments of the present invention.

FIG. 6 illustrates an environment 600 including embodiments of the present invention. 360 degree video processing system 602 includes processor 640, memory 642, and storage 644. System 602 is in communication with network 624. Network 624 may be the Internet, a wide area network, local area network, cloud computing network, or any other suitable network. Also in communication with network 624 are client device 604, video server 608, video renderer 634, social media system 616, database 622, and video repository 620. In implementations, more or fewer elements may be in communication with the network.

Memory 642 may include dynamic random access memory (DRAM), static random access memory (SRAM), magnetic storage, and/or a read only memory such as flash, EEPROM, optical storage, or other suitable memory. In some embodiments, the memory 642 may not be a transitory signal per se. Memory 642 includes instructions, which when executed by the processor, may implement one or more steps of embodiments of the present invention.

In embodiments, storage 644 may include one or more magnetic storage devices such as hard disk drives (HDDs). Storage 644 may include one or more solid state drives (SSDs). Any other storage device may be included instead of, or in addition to, those disclosed herein.

Client device 604 may be a 3D goggle headset (for a virtual or augmented reality experience), smart phone, tablet computer, laptop computer, desktop computer, or other suitable device. A user uses a client device to access video from the components of the environment 600. The video may be 2-dimensional or 3-dimensional. The video can include, but is not limited to, live-action, animation, computer generated images (CGI), virtual reality, or augmented reality.

Video server 608 hosts pre-navigated videos. Some embodiments include creation of a pre-navigated video that includes viewpoints selected to include objects within the video that are likely to be of interest to a user. The video(s) may be created based on metadata about the user, or crowd-sourced data about a plurality of users. Accordingly, when a user views a scene, rather than a user having to decide whether to go in a direction of a cue, the user's viewing orientation and/or direction of travel is automatically navigated based on the metadata. In embodiments, a pre-navigated video is created based on the plurality of DOV recommendations and/or DOT recommendations.

For example, system 602 may have scraped social media system 616 for data about the user. The data may indicate that the user has a particular interest in animals. Accordingly, a pre-navigated video may be created where a user is walking on a sidewalk, and the direction of view and travel is directed such that the user's orientation of view is toward points of interest that include a dog and a bird. The video may show the scene to the left, where a person is walking with her dog, and then forward where a bird is nested in a tall tree.

In another example, system 602 may scrape social media system for data about a plurality of users. System 602 may aggregate the data to determine that most people in a particular scene look to particular points of interests. For example, it may be determined that most people when viewing a 360 degree video of a house for sale, find the fireplace of interest and a basement vault of interest. Accordingly, a video may be created that walks the user to the fireplace and spends twice as much time looking at the fireplace and then the vault as the other objects in the scene.

Although a social media system is disclosed, in some embodiments, data is obtained from other sources instead of or in addition to the social media system. For example, user preference data could be manually input into a menu on a screen and saved to database 622. In another example, user preference data could be inferred from analysis of previous user actions. If 4 out of 5 times a user passes a dog, he spends 5 seconds staring at it as compared to 2 seconds for most everything else, embodiments will indicate (and save to database 622) that dogs are of interest to the user. Any suitable method of collecting user preference data is included within the scope of the invention.

Video renderer 634 makes renderings of video. Embodiments can include creating a video rendering based on the plurality of direction of view recommendations. As a user moves through a virtual space, video renderer 634 renders images (i.e. frames) in accordance with what would be the user's field of view at each moment in time. This can be accomplished by the user manually indicating direction of view or movement or by creation of a pre-navigated video. In some embodiments, a wearable device including sensors may provide the directional inputs for generating a pre-navigated video.

Social media system 616 hosts social media website(s). Social media system 616 can be scraped for information about users' interests. This information may be stored in database 622 in association with the user(s) to which it pertains. Some embodiments may include obtaining preference data relating to a user, analyzing the preference data to derive one or more keywords, and identifying objects in the 360 degree video that correspond to the one or more keywords. Also, or instead, the information may be stored and aggregated for a plurality of users. Some embodiments may include obtaining crowdsourced preference data, analyzing the crowdsourced preference data to derive one or more keywords, and identifying objects in the 360 degree video that correspond to the one or more keywords.

Video repository 620 includes a collection of 360 degree video files. The video files include data and metadata about a scene, and therefore, what the scene would look like from various vantage points. In some embodiments, the 360 degree videos may be tagged with metadata. The metadata can include object identification information, orientation information, and/or crowdsourced statistics information pertaining to one or more objects within the 360 degree video.

In some embodiments, 360 video processing system 602 obtains preference data for a user by scraping a social media system 616 and saving the data to database 622. System 602 analyzes the preference data to derive one or more keywords. Keywords may be extracted via natural language processing, or other suitable methods such as pattern patching, regular expressions, or the like. At least one object in the 360 degree video that corresponds to the one or more keywords is identified, by system 602, from videos in video repository 620. System 602 evaluates a proximity of the at least one identified object from a field of view of the user on the user device. System 602 then determines, based on the evaluation, that the identified objects are in a potential field of view. System 602 provides a direction of view or travel recommendation to a user device 604 in response to the determining.

In some embodiments, a biofeedback device 623 is used to gauge viewer interest. For example, wearable devices such as fitness trackers can be configured to relay biomedical information such as heart rate to a client device 604 via a communication protocol such as WiFi or Bluetooth. The heart rate can be used as a factor in determining potential interest and/or engagement. For example, the heart rate of a user may elevate when viewing a video of a tornado if it is engaging to the user. If a user registers an elevated heart rate when viewing a particular object, it can be counted as an interested view (IV). The client device 604 may then send an interested view IV notification to the processing system 602. The system 602 can be configured to keep track of the number of IVs received for a particular object within the 360 degree video to determine its popularity amongst viewers.

Figure 7:
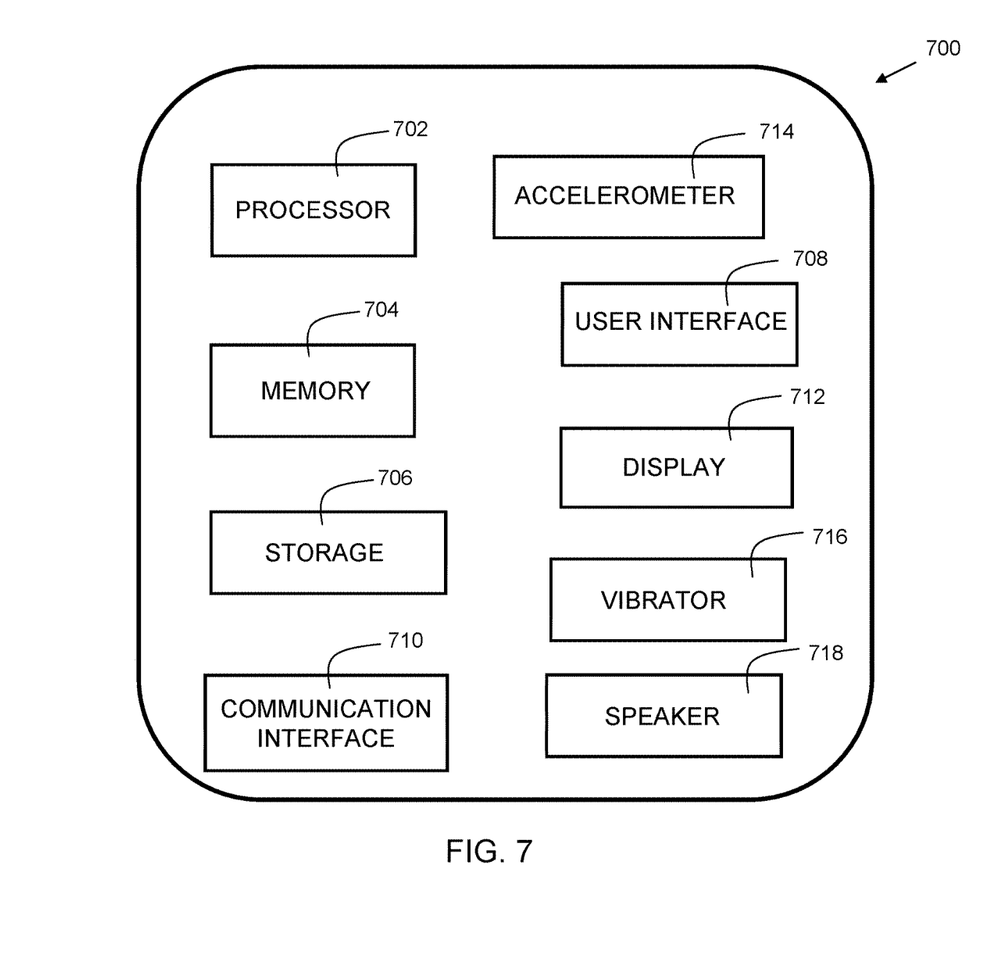
FIG. 7 illustrates a user device in accordance with embodiments of the present invention.

FIG. 7 illustrates a block diagram of a user device 700 (like client device 604 of FIG. 6) in accordance with embodiments of the present invention. Device 700 is shown as a simplified diagram of modules. Device 700 is an electronic computing device. Device 700 includes a processor 702, which is coupled to a memory 704. Memory 704 may include dynamic random access memory (DRAM), static random access memory (SRAM), magnetic storage, and/or a read only memory such as flash, EEPROM, optical storage, or other suitable memory. In some embodiments, the memory 704 may not be a transitory signal per se. Memory 704 includes instructions, which when executed by the processor, may implement one or more steps of embodiments of the present invention.

Device 700 may further include storage 706. In embodiments, storage 706 may include one or more magnetic storage devices such as hard disk drives (HDDs). Storage 706 may include one or more solid state drives (SSDs). Any other storage device may be included instead of, or in addition to, those disclosed herein.

Device 700 may further include a display 712, examples of which include a liquid crystal display (LCD), a plasma display, a cathode ray tube (CRT) display, a light emitting diode (LED) display, an organic LED (OLED) display, or other suitable display technology. The display may include a touch screen incorporating a capacitive or resistive touch screen in some embodiments. The device 700 may further include user interface 708 such as a keyboard, mouse, and/or buttons, etc.

The device 700 may further include a communication interface 710. In some embodiments, the communication interface 710 may include a wireless communication interface that includes modulators, demodulators, and antennas for a variety of wireless protocols including, but not limited to, Wi-Fi, and/or cellular communication protocols for communication over a computer network.

The device 700 may further include a vibrator 716 (or other device, such as a pulsator, gyrator, etc.). The vibrator may include a motor and head for imparting vibration as a cue containing haptic feedback to a user. In some embodiments, multiple vibrator devices may be used. For example, in a wearable device such as a vest, a vibrator may be disposed on the left side (which during use would be positioned over the left side of the torso of a user), and a second vibrator may be disposed on the right side (which during use would be positioned over the right side of the torso of the user). In such embodiments, when the user feels a vibration on his/her left side, that serves as a recommendation to look to the left. Similarly, when the user feels a vibration on his/her right side that serves as a recommendation to look to the right.

The device 700 may further include a speaker 718 for imparting a cue containing audio feedback to a user. In some embodiments, the device 700 may include multiple speakers. The speakers can be oriented as headphone speakers. In such embodiments, an audio cue to turn to the left may include a sound played through the left speaker. Similarly, an audio cue to turn to the right may include a sound played through the right speaker.

The device 700 may further include one or more accelerometers 714. The accelerometers 714 may be used to sense relative movement of the device 700. Thus as a user pans the device 700 left and right, or up and down, the accelerometer 714 provides orientation information to processor 702, which then determines a viewpoint corresponding to the orientation. In this way, the user can simply move a tablet, smartphone, or other mobile device to change the viewpoint.

Figure 8:
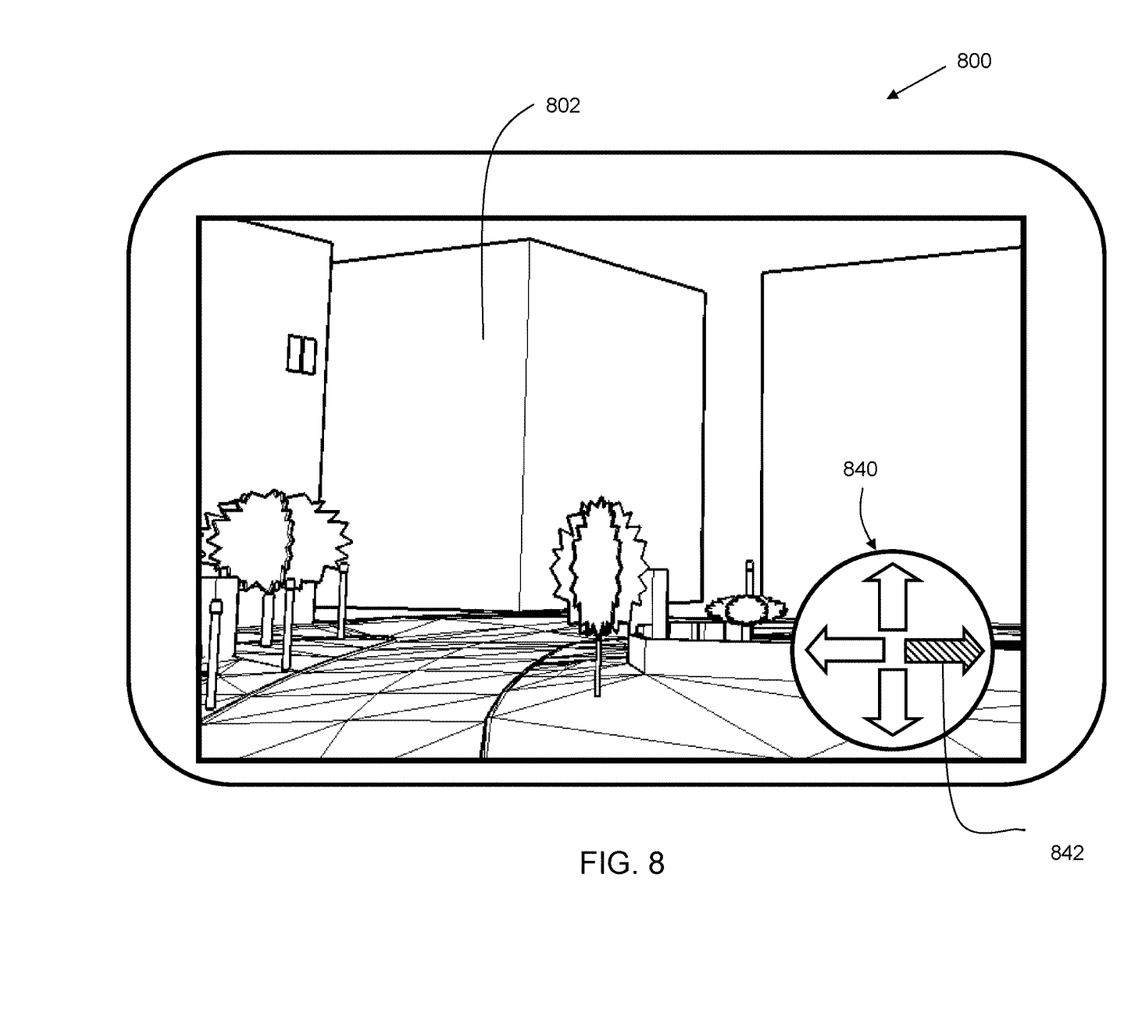
FIG. 8 illustrates another visual cue provided to a user device in accordance with embodiments of the present invention.

FIG. 8 illustrates an example 800 indicating another visual cue that is provided to a user device in accordance with embodiments of the present invention. In some embodiments, rather than using 3-dimensional goggles, a 2-D image/video is provided, for example, via tablet computer, smartphone, desktop computer, etc. Since some screens are small, and space on the screen is therefore limited, it may be desirable for cues to be compact so as not to take up too much room on the screen. In the example, there is shown a tablet computer which a user can hold in his/her hands. A scene 802 from the user's viewpoint is shown on the screen. Cues are provided using tool 840. Tool 840 has four arrows indicating four different directions. Arrow 842, pointing in the right direction, is shown shaded, indicating that the user should move his/her viewing orientation to the right. In embodiments, the user can move in such direction by moving the device itself to the right or pressing the arrow 842 with his/her finger. Shading as a direction indication is an example, and other mechanisms for indicting direction are included within the scope of embodiments of the invention. Additionally, tool 840 is shown as an example, and other mechanisms for receiving user input in terms of direction are included within the scope of embodiments of the invention.

Figure 9:
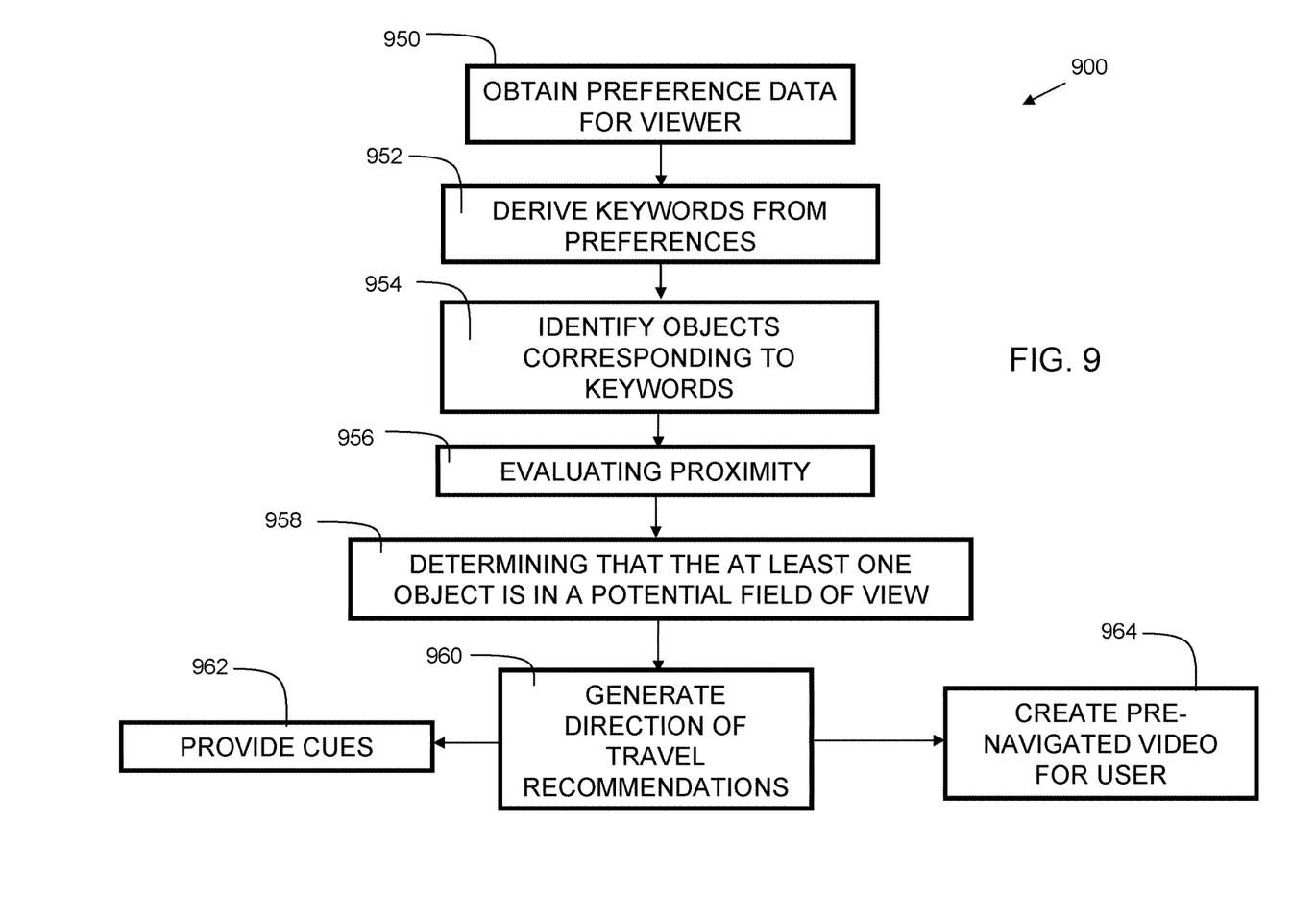
FIG. 9 is a flowchart indicating process steps for embodiments of the present invention.

FIG. 9 is a flowchart 900 indicating process steps for embodiments of the present invention. At 950, preference data for a viewer is obtained. This may be scraped from a social media site, detection of previous user actions, a user's manual entry, etc. At 952, keywords are derived from the preferences. At 954, objects corresponding to keywords are identified. This may be accomplished by comparison of the keywords to data about the objects in a look-up table. At 956, a proximity of the at least one identified object from a field of view of the user on the user device is evaluated. At 958, it is determined, based on the evaluation, that the identified at least one object is in a potential field of view. At 960, direction of view and/or travel recommendations are generated. At 962, cues are provided including the generated recommendations. The cues may be provided in visual, audio, or tactile form. At 964, pre-navigated videos are created for the user. The pre-navigated videos are created based on the obtained keywords pertaining to the user or pertaining to a plurality of users (i.e. crowdsourced data). In embodiments, the crowdsourced data can come from a video streaming website. For example, if, on a particular 360 degree video, a certain percent of the viewers viewed a certain object for at least a predetermined amount of time, then that is counted as an interested view. For example, if 80 percent of the viewers viewed a monument for more than 10 seconds, then that may count as an interested view (IV). In embodiments, objects within a 360 vide that receive more than a predetermined amount of IVs are deemed to be of interest, and those objects are then recommended to future viewers of that 360 degree video asset.

As can now be appreciated, disclosed embodiments provide techniques for enabling recommendations of viewpoints for 360 degree video. Additionally, disclosed embodiments include creation of a pre-navigated video that includes viewpoints selected to include objects within the video that are likely to be of interest to a user. Thus, disclosed embodiments have a variety of possible applications, including, but not limited to, education, real estate, tourism, gaming, and virtual reality.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer. other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for creating a recommendation of direction of view for a 360 degree video, comprising:

obtaining preference data for a user;

analyzing the preference data to derive one or more keywords;

identifying at least one object in the 360 degree video that corresponds to the one or more keywords;

evaluating a proximity of the at least one identified object from a field of view of a user on the user device;

determining, based on the evaluation, that the identified at least one object is in a potential field of view; and providing a plurality of direction of view recommendations to the user device in response to the determining.

2. The method of claim 1, wherein the direction of view recommendation is provided via a visual cue.

3. The method of claim 1, wherein the direction of view recommendation is provided via an audio cue.

4. The method of claim 1, wherein the direction of view recommendation is provided via a tactile cue.

5. The method of claim 1, further comprising creating a video rendering based on the plurality of direction of view recommendations.

6. The method of claim 1, further comprising providing a direction of travel recommendation.

7. The method of claim 1, further comprising
obtaining crowdsourced preference data;
analyzing the crowdsourced preference data to derive one or more keywords; and
identifying objects in the 360 degree video that correspond to the one or more keywords.

8. An electronic device for creating a recommendation of direction of view for a 360 degree video, comprising:
a processor;
a memory coupled to the processor, the memory containing instructions, that when executed by the processor, perform the steps of:
obtaining preference data for a user;
analyzing the preference data to derive one or more keywords;
identifying at least one object in the 360 degree video that correspond to the one or more keywords;
evaluating a proximity of the at least one identified object from a field of view of the user on a user device;
determining, based on the evaluation, that the identified at least one object is in a potential field of view; and
providing a plurality of direction of view recommendations to the user device in response to the determining.

9. The electronic device of claim 8, wherein the memory further contains instructions, that when executed by the processor, perform the step of providing a direction of view recommendation via a visual cue.

10. The electronic device of claim 8, wherein the memory further contains instructions, that when executed by the processor, perform the step of providing a direction of view recommendation via an audio cue.

11. The electronic device of claim 8, wherein the memory further contains instructions, that when executed by the processor, perform the step of providing a direction of view recommendation via a tactile cue.

12. The electronic device of claim 8, wherein the memory further contains instructions, that when executed by the processor, perform the step of creating a video rendering based on the plurality of direction of view recommendations to the user device.

13. The electronic device of claim 8, wherein the memory further contains instructions, that when executed by the processor, perform the step of providing a direction of travel recommendation to the user device.

14. The electronic device of claim 8, wherein the memory further contains instructions, that when executed by the processor, perform the steps of:
obtaining crowdsourced preference data;
analyzing the crowdsourced preference data to derive one or more keywords; and
identifying objects in the 360 degree video that correspond to the one or more keywords.

15. A computer program product for creating a recommendation of direction of view for a 360 degree video on an electronic computing device, the electronic computing device comprising a computer readable storage medium having program instructions embodied therewith, the program instructions executable by a processor to cause the electronic computing device to:
obtain preference data for a user;
analyze the preference data to derive one or more keywords;
identify at least one object in the 360 degree video that correspond to the one or more keywords;
evaluate a proximity of the at least one identified object from a field of view of the user on a user device;
determine, based on the evaluation, that the identified at least one object is in a potential field of view; and
provide a plurality of direction of view recommendations to the user device in response to the determining.

16. The computer program product of claim 15, further comprising program instructions executable by the processor to cause the electronic computing device to create a video rendering based on the plurality of direction of view recommendations to the user device.

17. The computer program product of claim 15, further comprising program instructions executable by the processor to cause the electronic computing device to:
obtain crowdsourced preference data;
analyze the crowdsourced preference data to derive one or more keywords; and
identify objects in the 360 degree video that correspond to the one or more keywords.

* * * * *